(12) United States Patent
König

(10) Patent No.: US 11,498,472 B2
(45) Date of Patent: Nov. 15, 2022

(54) STRUCTURE AND VEHICLE WITH A STRUCTURE

(71) Applicant: Marc König, Wittnau (DE)

(72) Inventor: Marc König, Wittnau (DE)

(*) Notice: Subject to any disclaimer, the term of this patent is extended or adjusted under 35 U.S.C. 154(b) by 218 days.

(21) Appl. No.: 16/972,242

(22) PCT Filed: Jun. 6, 2018

(86) PCT No.: PCT/EP2018/064835
§ 371 (c)(1),
(2) Date: Dec. 4, 2020

(87) PCT Pub. No.: WO2019/233573
PCT Pub. Date: Dec. 12, 2019

(65) Prior Publication Data
US 2021/0323465 A1    Oct. 21, 2021

(51) Int. Cl.
*B60P 3/34* (2006.01)
(52) U.S. Cl.
CPC ..................... *B60P 3/34* (2013.01)
(58) Field of Classification Search
CPC .......... B60P 3/34; B60P 3/38; E04B 1/34305; E04B 1/34357; E04B 1/34363; E04B 1/3431
USPC .. 296/26.02, 26.03, 165, 171–173, 175, 176
See application file for complete search history.

(56) References Cited

U.S. PATENT DOCUMENTS

| | | | | |
|---|---|---|---|---|
| 1,436,984 A | * | 11/1922 | Follett | B60P 3/34 296/26.02 |
| 2,561,921 A | | 7/1951 | Edouard | |
| 3,506,300 A | | 4/1970 | Remmert | |
| 3,888,539 A | * | 6/1975 | Niessner | B60P 3/34 296/156 |
| 4,017,116 A | | 4/1977 | Hulsey | |
| 4,270,791 A | | 6/1981 | Tann | |
| 5,154,469 A | | 10/1992 | Morrow | |
| 5,185,973 A | | 2/1993 | Oldani | |
| 6,712,414 B2 | * | 3/2004 | Morrow | B60P 3/34 52/79.5 |
| 7,644,971 B1 | * | 1/2010 | Ludwick | B60P 3/34 296/26.02 |

(Continued)

FOREIGN PATENT DOCUMENTS

DE            7430342 U      1/1975
DE          10154848 C1      2/2003

*Primary Examiner* — Gregory A Blankenship
(74) *Attorney, Agent, or Firm* — Smartpat PLC

(57) ABSTRACT

In a structure, for example in the form of a trailer cabin (115), which structure is advantageously provided for connection to a vehicle (103), the following are provided as sliding segments: a number of horizontal sliding segments (201) slidable in an expansion direction, vertical sliding segments (136) slidable in an extension direction at a right angle to the expansion direction, and double sliding segments (139) which are slidable both in the expansion direction and in the extension direction and which are connected to a central fixed segment (403). Thus, when the sliding segments (136, 139, 201) are transferred from a pushed-together compact position into a pulled-out expansion position, an interior space of the structure (115) can be considerably enlarged by a usable space in comparison with a minimum volume in the compact position.

15 Claims, 18 Drawing Sheets

(56) References Cited

U.S. PATENT DOCUMENTS

| | | | |
|---|---|---|---|
| 8,141,304 B2* | 3/2012 | Shen | E04B 1/3444 |
| | | | 52/645 |
| 8,267,455 B1* | 9/2012 | Ludwick | B60P 3/34 |
| | | | 296/26.04 |
| 9,233,635 B2* | 1/2016 | Wegkamp | B60P 3/34 |
| 9,597,993 B2* | 3/2017 | Pellicer | B62D 63/061 |
| 10,106,998 B2* | 10/2018 | Lyons, Jr. | E04H 1/1205 |
| 10,538,192 B2* | 1/2020 | Zhou | B60P 3/343 |
| 2005/0055891 A1 | 3/2005 | Kuebler | |
| 2018/0258658 A1* | 9/2018 | Cruz | E04H 1/1205 |
| 2021/0323465 A1* | 10/2021 | König | E04B 1/34305 |

* cited by examiner

STRUCTURE AND VEHICLE WITH A STRUCTURE

TECHNICAL FIELD

The disclosure generally relates to a structure and to a vehicle and to a vehicle equipped with a structure. The disclosure more specifically relates to a trailer cabin suitable for connection to a vehicle and to a vehicle with a trailer cabin.

BACKGROUND

A structure for receiving equipment that is selectively arranged in an interior space and for providing, when necessary, a usable space extended to the interior space is known from U.S. Pat. No. 4,270,791 A. This structure has a central fixed segment and a number of sliding segments, mounted slidably in relation to the central fixed segment in a plane in at least one expansion direction, which sliding segments are slidable between a compact position having a minimum volume and an expansion position having a maximum volume. The sliding segments are in this case formed as at least one sliding segment of a first group, wherein the or each sliding segment of the first group is slidable in at least one expansion direction within a first plane, as at least one sliding segment of a second group, wherein the or each sliding segment of the second group is slidable in an extension direction oriented at a right angle to the or each expansion direction within at least one second plane different from the first plane, and as at least one sliding segment of a third group, wherein the or each sliding segment of the third group is slidable both in the or one expansion direction within the first plane and within the or a second plane in the second direction, wherein at least one sliding segment of the third group engages with respectively one sliding segment of the two other groups. This structure is designed to guide the sliding segments in the manner of an exoskeleton.

A further structure for receiving equipment selectively arranged in an interior space and for providing, when necessary, a usable space extending the interior space is known from DE 101 54 848 C1. The previously known structure designed as a mobile container has a cuboid, central fixed segment closed on the top side and a number of sliding segments mounted on the central fixed segment so as to be slidable within a plane with respect to the central fixed segment. The sliding segments engage in side walls of the central fixed segment and are slidable between a compact position having a minimum volume occupied when the sliding segments are fully slid in and an expansion position having a maximum volume occupied when the sliding segments are fully extended.

From DE 74 30 342 U, an extendable, box-shaped attachment for vehicles is known which has a number of rectangular, circumferentially closed sliding segments. The sliding segments are arranged on a roof side of the vehicle and their dimensions are such that they lie one inside the other in a compact position and are telescopically pulled-out in an expansion position, so that the usable height of the vehicle is increased.

Further structures with sliding segments are known from U.S. Pat. Nos. 2,561,921 A, 1,436,984 A, 5,185,973 A and 4,017,116 A.

SUMMARY

The object is to disclose a structure of the type mentioned at the outset and a vehicle equipped with such a structure, which structure or vehicle is characterised by a very high degree of stability and good sealing with a relatively small distance between the side walls with a low friction loss. This object is achieved with a structure as claimed.

Due to the fact that on the walls of the sliding segments, there are formed guides oriented at right angles to each other as well as the sliding segments in groups with inwardly-projecting edges and outwardly-projecting edges of different lengths, including sliding segments of other groups and thus an alternating arrangement of the sliding segments of one group with encompassing around a sliding segment of another group, with circumferential contact regions formed with sealing lips therebetween, there is a low friction loss with a high degree of stability and at the same time a good seal.

In the case of an expedient structure, the guides each have a guide rail and a guide carriage engaging with the relevant guide rail for a particularly low friction loss with good stability.

In a further expedient structure, it is provided that the sliding segments of the three groups are mounted so as to be able to slide into one another, such that, due to the sliding segments of the three groups sliding completely into one another with side walls and top walls arranged closely adjacently to one another with a wall-free interior space, the minimum volume of the structure in the compact arrangement corresponds to the volume occupied by the outermost sliding segment of one of the groups. This creates a maximum usable space.

In further developments of the aforementioned expedient structures, it is provided that the central fixed segment and sliding segments of the second group in each case engage with two sliding segments of the third group, wherein the two sliding segments of the third group are arranged on opposite sides of the central fixed segment or sliding segment of the second group engaging with them. As a result, due to the sliding segments of the third group arranged on both sides of a sliding segment of the second group or of the central fixed segment, a particularly large usable space is created.

In a further expedient structure, it is provided that sliding segments of the first group and the third group are slidable in two expansion directions oriented at right angles to each other and that sliding segments of the first group as well as the third group engage in corner regions between sliding segments of the first group and the third group engaging with sliding segments of the second group or with the central fixed segment. The two expansion directions create an extremely large usable space.

In a further expedient structure, the outwardly-projecting edges and the inwardly-projecting edges are engaged alternatingly with one another in order to ensure that, when a sliding segment moves, other sliding segments are passively moved along therewith.

In a further expedient structure, sliding segments of a group and the central fixed segment are equipped with door leaves which, in the expansion position of these sliding segments, are arranged so as to align with one another within the different planes. This creates good accessibility to the interior space in the expansion position.

In a further expedient structure, at least one supporting strut is attached to the or each sliding segment of the first group engaging with the central fixed segment. This results in a stable support.

In the last-mentioned expedient structure, the supporting strut or supporting struts advantageously extend in the first direction. This provides a compact, integrated support.

In a further expedient structure, installation elements are selectively attached to at least one sliding segment at least of one group and to the central fixed segment as equipment, with the advantage of good usability of the interior space.

In an advantageous further development of the last-mentioned expedient structure, at least some installation elements are directly adjacent to one another in the compact position. As a result, the interior space is optimally used in the compact position.

Advantageously, at least one installation element is connected to a flexible supply line in structures equipped with installation elements. This means that the structure can be supplied with electricity, water and/or gas, for example.

In an expedient vehicle, the supporting strut is or the supporting struts are slidably mounted on a body of the vehicle. This results in good support of the structure on the vehicle, which is usually already stable.

In a further expedient vehicle, the supply line is or the supply lines are connected to the vehicle. As a result, the vehicle itself can advantageously be equipped with supply containers and expediently also with disposal containers.

Further expedient embodiments and advantages of the invention emerge from the following description of an exemplary embodiment of the invention with reference to the figures of the drawing.

DETAILED DESCRIPTION

As an introduction and clarification, it should be mentioned that in the following description, terms such as "left", "right", "front", "rear", "horizontal", "vertical", "top" and "bottom" have been selected for reasons of clarity and relate to a typical operational arrangement of the components identified, but not to an absolutely spatially fixed coordinate system. For example, the terms "left", "right", "front", "rear", unless otherwise mentioned, refer to a forward direction of travel, while the terms "horizontal", "vertical", "top" and "bottom" relate to the direction of gravity. It goes without saying, however, that these terms, which are used for reasons of clarity, do not represent any restrictions with regard to a different orientation of the components identified with them.

Figure 1:
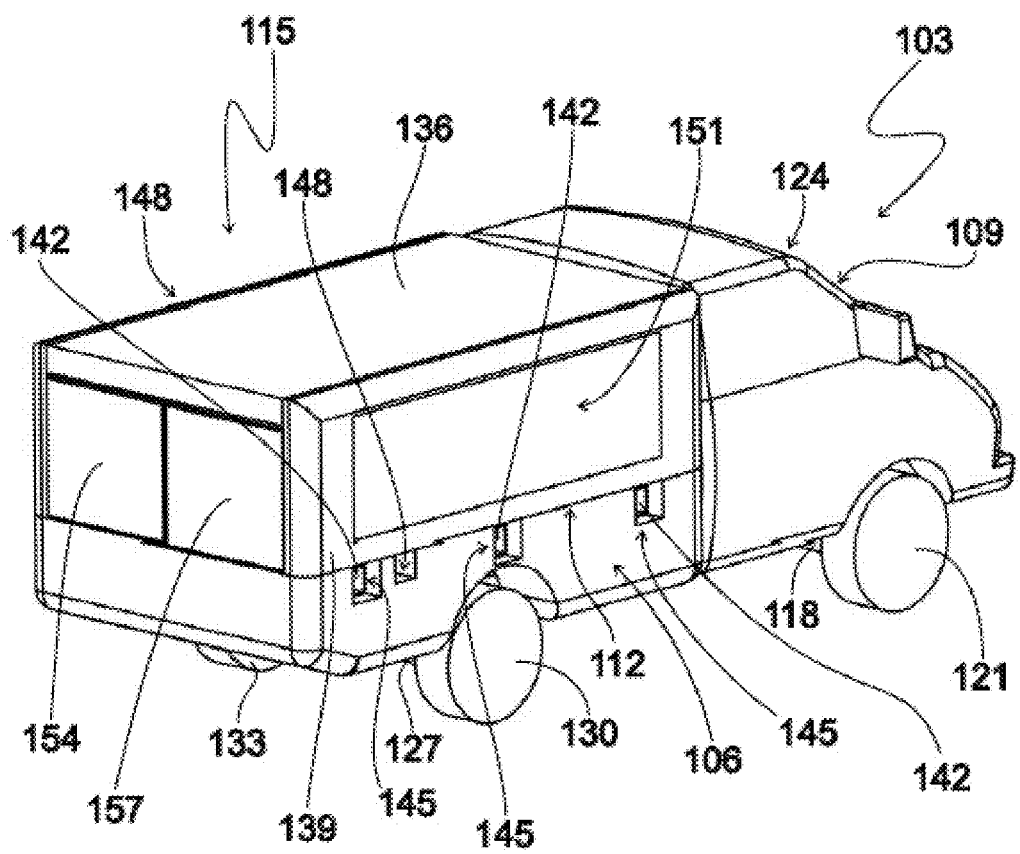
FIG. 1 shows a perspective view of an exemplary embodiment having a vehicle and having a structure attached to the vehicle, in which sliding segments are arranged in a compact position.

FIG. 1 shows, in a perspective view, an exemplary embodiment of the invention with an exemplary vehicle designed as a motor vehicle 103. The motor vehicle 103 has a body 106 with a driver's cab 109 and a contact surface 112, which is located behind the driver's cab 109 with respect to a forwards direction of travel and on which a structure, configured for example as a trailer cabin 115, is arranged and attached. To operate the vehicle as a motor vehicle 103, on the body 106, there are attached a front axle 118, which is arranged in the area of the driver's cab 109 and has a front wheel 121 on the right-hand side with respect to a direction of travel of the motor vehicle 103 and with a left front wheel not visible in the view according to FIG. 1, and a rear axle 127, which is located in the area of the body 106 furthest away from the driver's cab 109 and is located to the rear in relation to a direction of travel, with a right rear wheel 130 and a left rear wheel 133 with respect to a forwards travel direction of the motor vehicle 103.

The trailer cabin 115 has a central fixed segment, which is not visible in the representation according to FIG. 1 and which is connected to the body 106, a number of sliding segments, which are not visible in the representation according to FIG. 1 and which are slidably mounted and in engagement with the central fixed segment or with one another, which sliding segments are of a first group designed for sliding in a transverse direction as the expansion direction within the plane in which the central fixed segment is arranged, in the following also clearly referred to as horizontal sliding segments, a number of sliding segments 136 of a second group designed for sliding in a vertical direction as an additional direction that is at a right angle to the expansion direction, in the following also clearly referred to as vertical sliding segments 136, and a number of sliding segments 139 of a third group, which are slidably mounted in the expansion direction and in the extension direction and are each in engagement with a vertical sliding segment 136 of the second group, in the following also clearly referred to as double sliding segments 139, wherein, in this exemplary embodiment, the horizontal sliding segments and the double sliding segments 139 are arranged in the transverse direction on both sides of the central fixed segment or the vertical sliding segments 136.

In the arrangement according to FIG. 1, the sliding segments 136, 139 of the three groups are shown completely pushed into one another in a compact position, occupying a minimum volume, so that of the double sliding segments 139 only the two double segments 139 lying on the outside to the side of the vertical sliding segments 136 in the usual operational arrangement according to FIG. 1 and of the vertical sliding segments 136 only the outer vertical sliding segment 136 are visible.

In the compact position, the trailer cabin 115 in this exemplary embodiment has a cuboid shape, wherein the longitudinal direction of the trailer cabin 115 is oriented in the direction of travel of the motor vehicle 103, the side walls of the outer double sliding segments 139 each close substantially flush with the side of the driver's cab 109 and the top side of the outer vertical sliding segment 136, which is at the top in the typical operational arrangement, terminates with the roof of the driver's cab 109.

In the exemplary embodiment according to FIG. 1, the trailer cabin 115 is connected to the body 106 of the motor vehicle 103, inter alia, via supporting struts 142 which are arranged in supporting strut receptacles 145 formed in the body 106 of the motor vehicle 103. Furthermore, at least one cable receptacle 148 is formed in the body 106 of the motor vehicle 103 and is provided for receiving at least one flexible supply line, not visible in FIG. 1, for example, designed in the manner of a drag chain, for electricity, water and/or gas, for example, as well as to the trailer cabin 115 and possibly also to dispose of waste water from the trailer cabin 115.

Furthermore, it can be seen from the representation according to FIG. 1 that in this exemplary embodiment at least the outer double sliding segments 139 are equipped with light-permeable windows 151. The vertical sliding segments 136 are formed on the rear side of the trailer cabin 115 furthest away from the driver's cab 109 in the arrangement according to FIG. 1 as door leaves with left sliding door leaves 154 and right sliding door leaves 157 in relation to the direction of travel. The sliding door leaves 154, 157 are mounted slidably at a right angle to the longitudinal direction of the trailer cabin 115.

Figure 2:
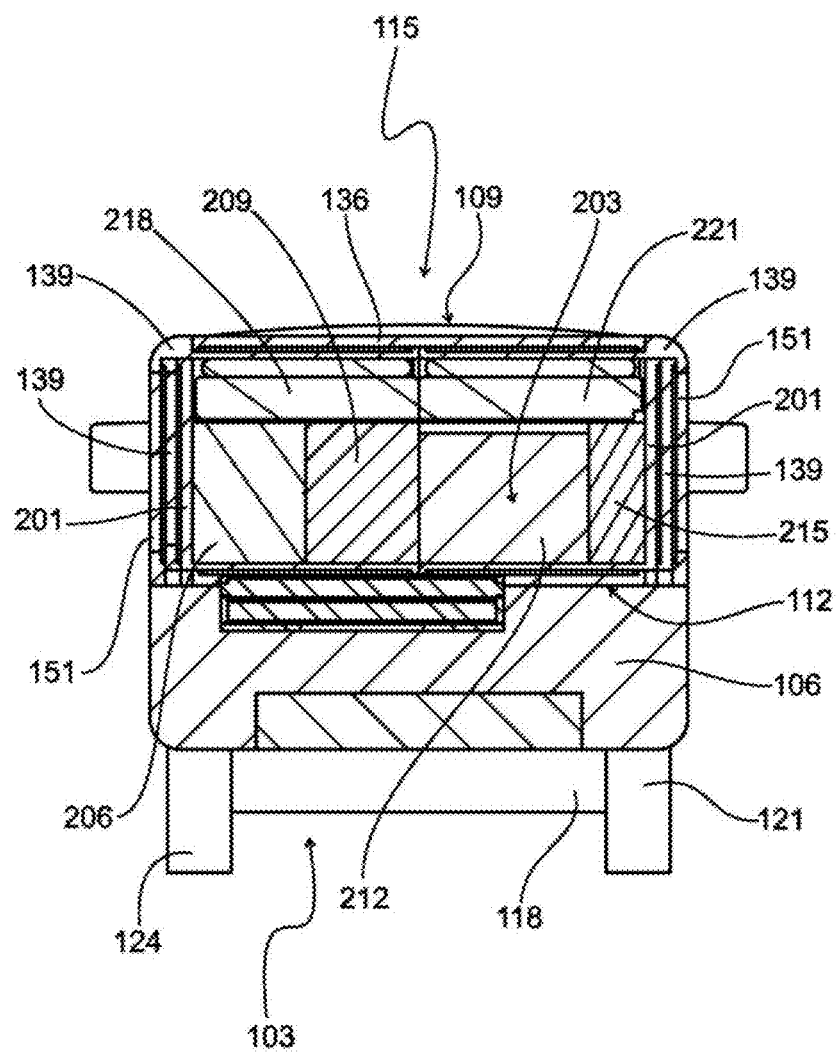
FIG. 2 shows a sectional view through the vehicle and the structure of the embodiment according to FIG. 1 with the sliding segments in the compact position.

FIG. 2 shows in a sectional view through the vehicle 103 and the trailer cabin 115 the embodiment according to FIG. 1 with the sliding segments 136, 139 of the three groups in the compact position, wherein the sectional plane is positioned transverse to the longitudinal direction of the trailer cabin 115 and on the side of the rear axle 127 of the motor vehicle 103 facing away from the driver's cab 109. As a result, it can be seen from the representation according to FIG. 2 that the side walls of the inner horizontal sliding segments 201 now visible in the representation and of the double sliding segments 139 are arranged towards the outside in the sense of a substantially gap-free arrangement closely adjacent to one another and an interior space 203 of the trailer cabin 115 is free of walls of the sliding segments 136, 139, 201 of the three groups.

Furthermore, it can be seen from the representation according to FIG. 2 that in the interior space 203 of the trailer cabin 115, which is enclosed by the sliding segments 136, 139, 201 of the three groups, a number of installation elements are available as equipment in the form of, for example, an outside storage cabinet 206, an inside storage cabinet 209, a lower kitchen cupboard 212 and an upper kitchen cupboard 215, which are arranged closely adjacent to one another in the transverse direction of the trailer cabin 115, and on the side of these installation elements facing away from the contact surface 112, as further installation elements, a left bed 218 and a right bed 221 in relation to a forward direction of travel are available.

In the compact position according to FIGS. 1 and 2, the left bed 218 and the right bed 221 are arranged close to one another in the transverse direction of the trailer cabin 115 and in the vertical direction of the trailer cabin 115 between the side of the outer vertical sliding segment 136 facing the interior space 203 and the storage cupboards 206, 209 and kitchen cabinets 212, 215, so that in the compact position the interior space 203 in this area is substantially completely filled with installation elements and is thus free of cavities.

Figure 3:
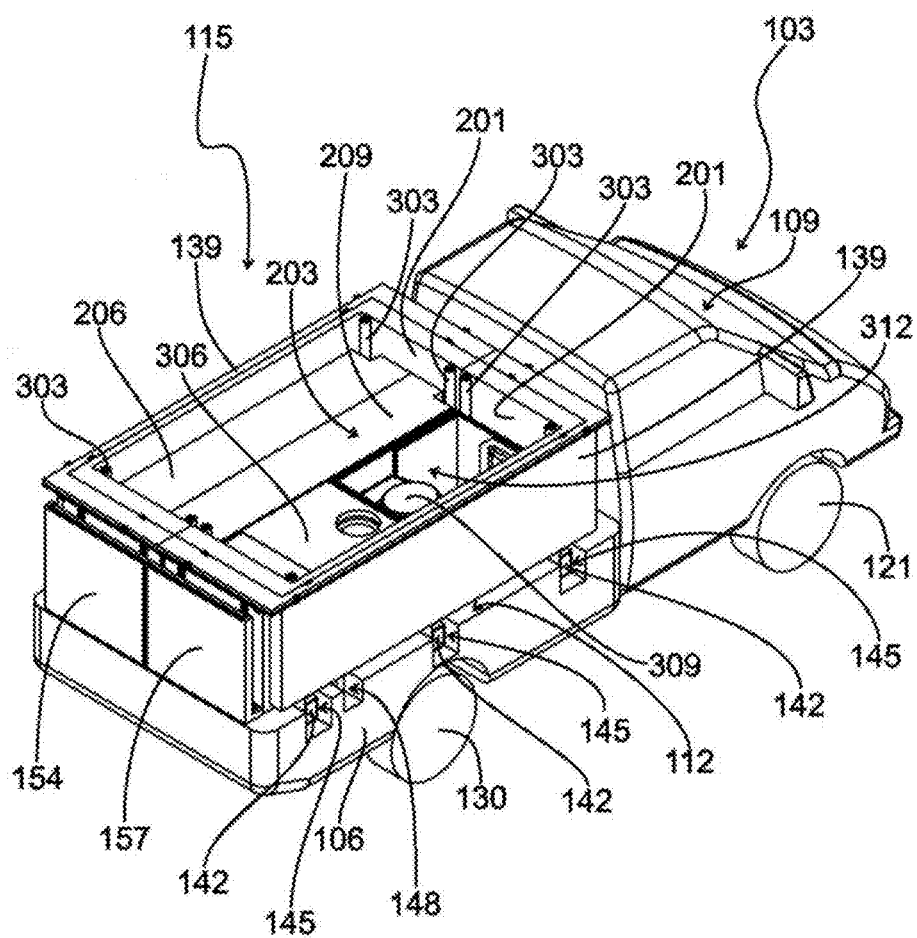
FIG. 3 shows a perspective view of the embodiment according to FIG. 1 with removed outer sliding segments and removed top-side equipment and with the remaining sliding segments in the compact position with a view of an interior space equipped with additional equipment.

FIG. 3 shows a perspective view of the exemplary embodiment according to FIG. 1 with removed outer sliding segments 136, 139 of the second group and the third group, with removed beds 218, 221 and with the remaining sliding segments 139, 201 in the compact position with a view of the interior space 203. From FIG. 3, it can be seen in particular that the trailer cabin 115 has a number of telescopic spindles 303 working in the vertical direction, which are arranged in the inside corner regions of the trailer cabin 115 and in the mutually facing joint areas of the inside transverse walls of the horizontal sliding segments 201 and of the outer double sliding segments 139 that are removed in the representation according to FIG. 3. The telescopic spindles 303 are operatively connected on the one hand to the horizontal sliding segments 201 as an abutment and on the other hand are connected to the outer double sliding segments 136.

Furthermore, the representation according to FIG. 3 shows that, that as installation elements, next to the kitchen cabinets 212, 215 as components of a kitchenette 306, a toilet unit 309 is also present as a further installation element of a sanitary cubicle 312 arranged on the side of the trailer cabin 115 facing the driver's cab 109.

Figure 4:
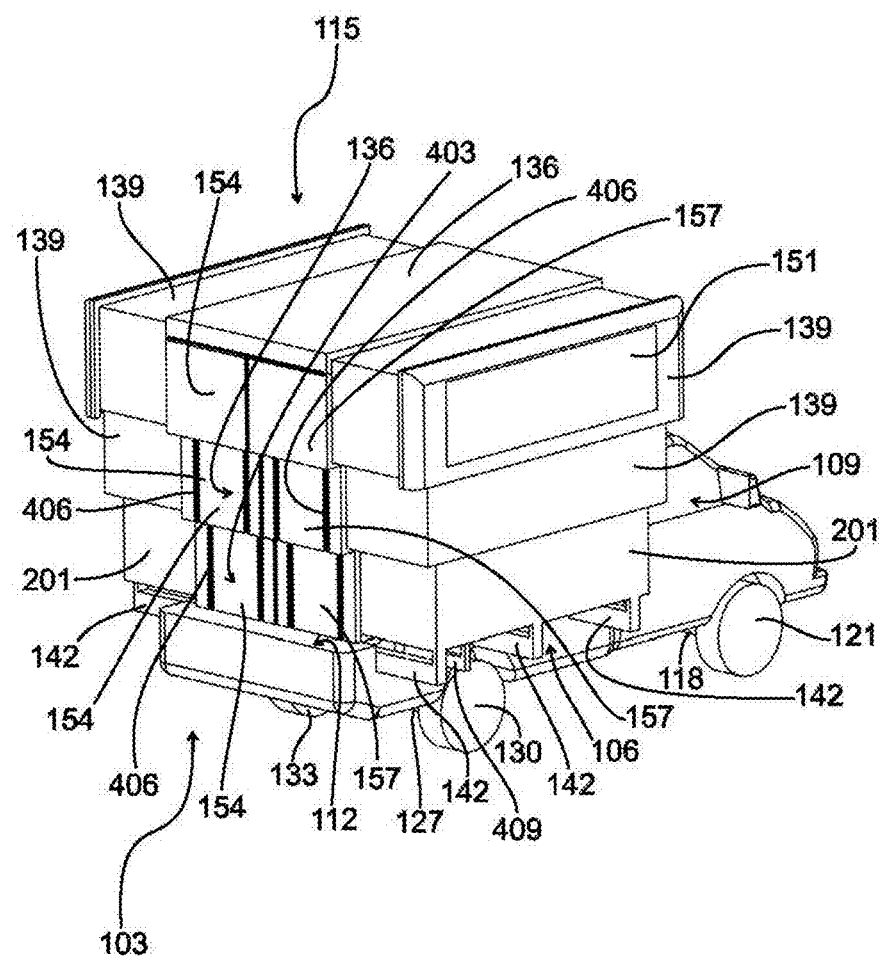
FIG. 4 shows a perspective view of the embodiment according to FIG. 1 with the sliding segments in an expansion position.

FIG. 4 shows the exemplary, previously explained trailer cabin 115 in an expansion position, for whose occupation for providing, when necessary, a usable space, starting from the compact position shown in FIG. 1 to FIG. 3, the double sliding segments 139 have been shifted by means of the telescopic spindles 303 acting in the vertical direction as an extension direction, taking along the vertical sliding segments 136 and preferably then the horizontal sliding segments 201 or the upper double sliding segments 139 for example, with rack and pinion drives, not shown, acting in a transverse direction at a right angle to the vertical direction as an expansion direction taking along the non-driven horizontal sliding segments 201 or double sliding segments 139.

The representation according to FIG. 4 shows that the trailer cabin 115, in addition to the slidable sliding segments 136, 139, 201 of the three groups, has the central fixed segment 403, which is now visible in the representation according to FIG. 4, which is fixedly connected to the body 106 of the motor vehicle 103 and is arranged on the contact surface 112. On the inside of the transverse walls of the central fixed segment 403, transverse walls of horizontal sliding segments 201 are arranged, which remain within the plane of the central fixed segment 403 as the lower plane both in the compact position and in the expansion position.

In a further second and, in this exemplary embodiment, central plane, which is distanced in the vertical direction from the lower plane, in which the central fixed segment 403 and the two aforementioned horizontal sliding segments 201 are arranged, a lower vertical sliding segment 136 is arranged in the expansion position and two lower double sliding segments 139 are arranged in the transverse direction on the outside on both sides of the lower vertical sliding segment 136. In a third and, in this exemplary embodiment, upper plane, located on the side of the central plane facing away from the lower level, an outer vertical sliding segment 136, located at the top in the arrangement according to FIG. 4, is arranged in the expansion position and two outer double sliding segments 139 located laterally in the arrangement according to FIG. 4 are arranged in the transverse direction on both sides of the outer vertical sliding segment 136.

As can be seen from the representation according to FIG. 4, each vertical sliding segment 136 of the second group is preferably in engagement with exactly one vertical sliding segment 136 of the second group and with at least one, in the illustrated exemplary embodiment with two, double sliding segments 139 of the third group. Each double sliding segment 139 of the third group is in engagement with exactly one double sliding segment 139 of the third group and with exactly one vertical sliding segment 136 of the second group. The horizontal sliding segments 201 each engage with the central fixed segment 403 and with an inner double sliding segment 139 of the third group.

In the case of the sliding segments 136 of the second group, the engagement of the outer sliding segment 136 of the second group with the lower sliding segment 136 of the second group is designed in such a way that, when the outer sliding segment 136 of the second group is moved away from the central fixed segment 403, the lower sliding segment 136 of the second group is passively taken along.

In the case of the sliding segments 139, 201 of the first group and the third group, the mutual engagement is designed in such a way that, when the horizontal sliding segments 201 of the first group or the upper double sliding segments 139 of the third group are moved in the transverse direction as an expansion direction, the other sliding segments 139, 201 of the first or third group are also taken along.

This interaction, for example through a protrusion on the edge, ensures reciprocal entrainment of non-actively driven sliding segments 136, 139, 201 when moving the trailer cabin 115 from the compact position shown for example in FIG. 1 to the expansion position shown in FIG. 4.

Furthermore, it can be seen from the representation according to FIG. 4 that each vertical sliding segment 136, i.e. each sliding segment 136 of the second group, has a left sliding door leaf 154 and a right sliding door leaf 157 in relation to a forward direction of travel, each of which is slidable outwards in the transverse direction into an open position and back into a closed position, which is shown in FIG. 4. The sliding door leaves 154, 157 are aligned with the left sliding door leaves 154 or with the right sliding door leaves 157 of the other respective vertical sliding segments 136 in the open position or in the closed position as end positions. Expediently, sliding door leaves 154, 157 aligned with one another are coupled to one another in the end positions in such a way that, when a sliding door leaf 154, 157 is moved, the other two sliding door leaves 154, 157 coupled thereto are moved along with it.

Furthermore, it can be seen from the representation according to FIG. 4 that the outer ends of the supporting struts 142 are connected to the outer sides of the horizontal sliding segments 201 and engage in supporting strut guides connected to the body 106. As a result, the horizontal sliding segments 201 and with them the double sliding segments 139 are guided in a stable and load-bearing manner in the transverse direction.

To support particularly high loads, additional extendable floor supports, not shown in FIG. 4, are provided, which, if necessary, are arranged between the floor and the undersides of the horizontal sliding segments 201 facing the floor.

Finally, FIG. 4 schematically shows vertical guides 406 attached to the central fixed segment 403 and to the vertical sliding segments 136, which are used for the easy and, in particular, tilt-free movement of the vertical sliding segments 136, and a supply line 409, which is connected to the supply containers and disposal containers installed on the sanitary cubicle 312 and in the body 106.

Figure 5:
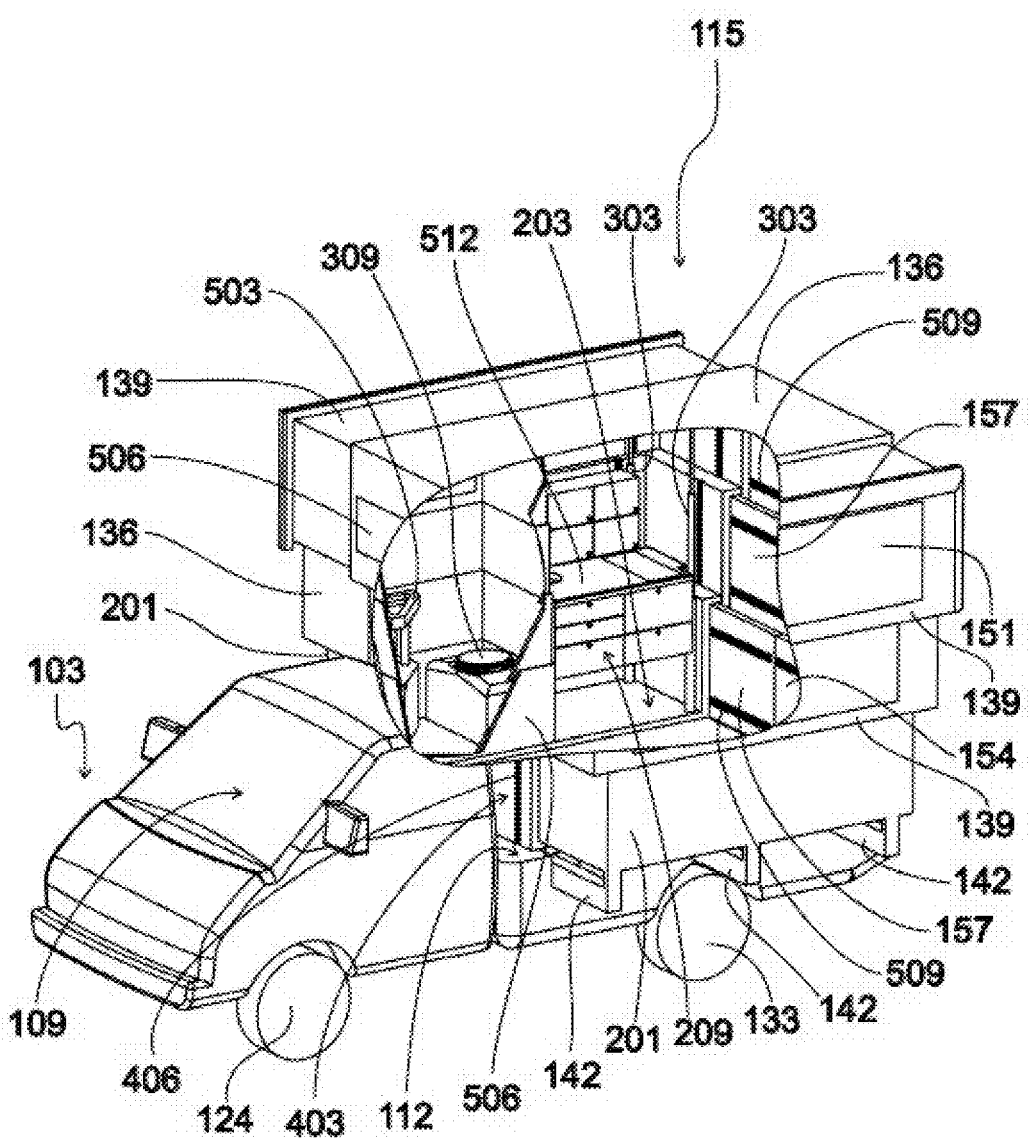
FIG. 5 shows a perspective view of the exemplary embodiment according to FIG. 1 with the sliding segments in the arrangement according to FIG. 4 with side walls and top walls torn open in a first region with a view of the interior space, now enlarged by a usable space in comparison to the arrangement according to FIG. 3, in the area of a sanitary cubicle and a kitchenette.

FIG. 5 shows a perspective view of the embodiment according to FIG. 1 with the sliding segments 136, 139, 201 in the expansion position according to FIG. 4 with side walls and top walls of sliding segments 136, 139 torn open in a first region, with a view of the interior space 203, now enlarged by a usable space in contrast to the compact position according to FIG. 3, in the area of the kitchenette 306 and the sanitary cubicle 312 which is equipped, in addition to the toilet 309, with a retractable wash basin 503 and a bathroom partition wall 506 to delimit a shower area. FIG. 5 clearly shows that the interior space 203 of the trailer cabin 115, enlarged by the usable space and supported in the vertical direction by the telescopic spindles 303 extended in the second direction, is now accessible to users and thus usable as living space.

The side wall of the upper vertical sliding segment 136 and preferably also of the lower vertical sliding segment 136 opposite the sliding door leaves 154, 157 is or are expediently equipped in each case with a light-permeable window 506 to allow light to enter the interior space 203.

Furthermore, the representation according to FIG. 5 shows that the sliding segments 136, 139, 201 are equipped with horizontal guides 509 in order to allow the sliding segments 136, 139, 201 to be displaced with as little force as possible in the transverse direction as the expansion direction. In terms of practical use, it is advantageous that, after the right double sliding segments 139 have been pushed out, a storage area 512 is created on the inside storage cupboards 209.

Figure 6:
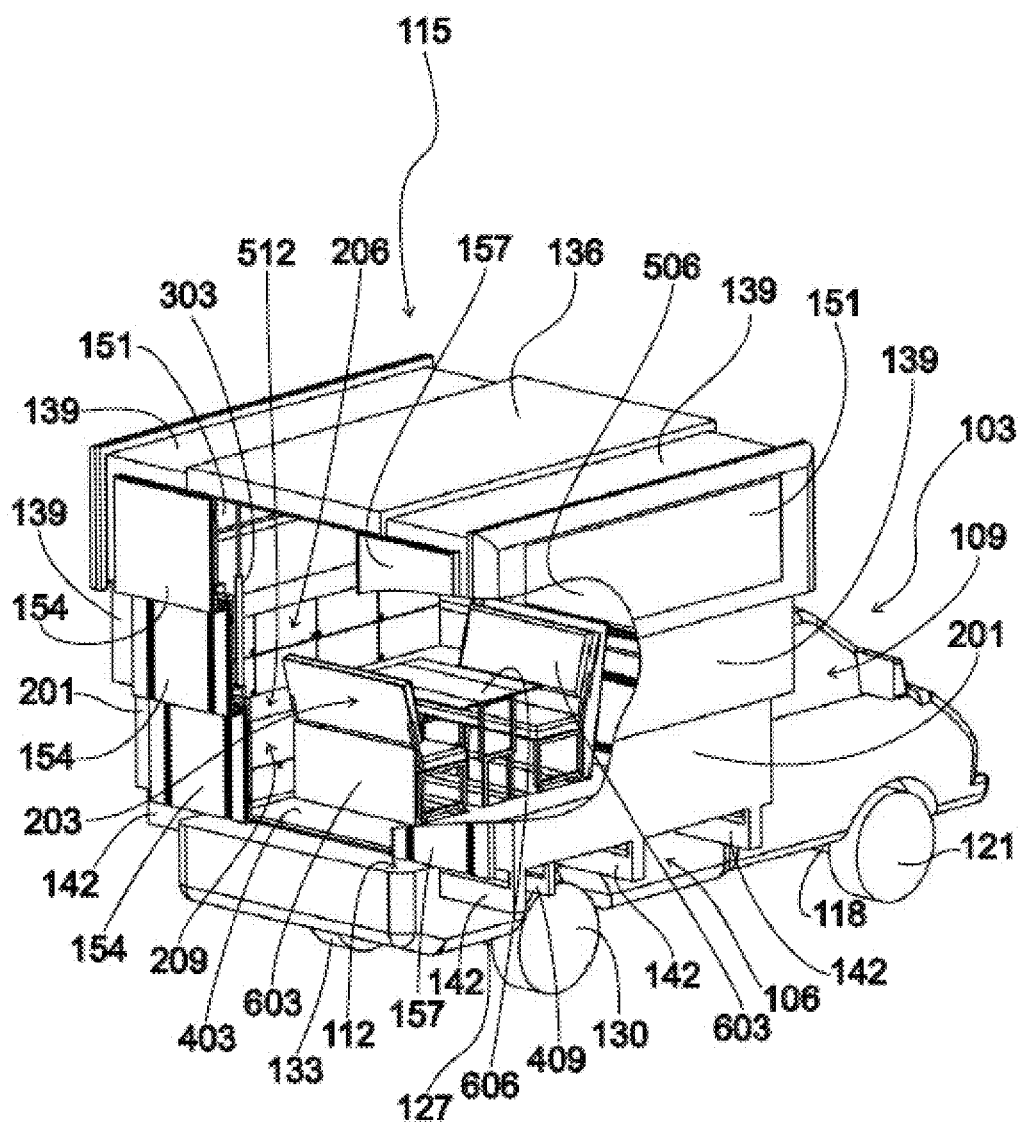
FIG. 6 shows a perspective view of the exemplary embodiment according to FIG. 1 in the arrangement according to FIG. 5 with side walls torn open in a second region with a view of the interior space, now enlarged by a usable space in comparison to the arrangement according to FIG. 3, in the area of cabinet elements and seating elements.

FIG. 6 shows a perspective view of the embodiment according to FIG. 1 in the arrangement according to FIG. 5 with open sliding door leaves 154, 157 with side walls of sliding segments 136, 139, 201 torn open in a second region with a view of the interior space 203 now enlarged by a usable space in comparison to the arrangement according to FIG. 3 in the area of storage cupboards 206, 209 and seating benches 603, and a table 606 arranged between the seating benches 603 as further installation elements in the form of a suite. The seating benches 603 and the table 606 are preferably foldable and designed to be retractable into an intermediate floor of the central fixed segment 403 in order to be able to remove these from the interior space 203 when not in use in the interior space 203 and to move the trailer cabin 115 into the compact position.

Figure 7:
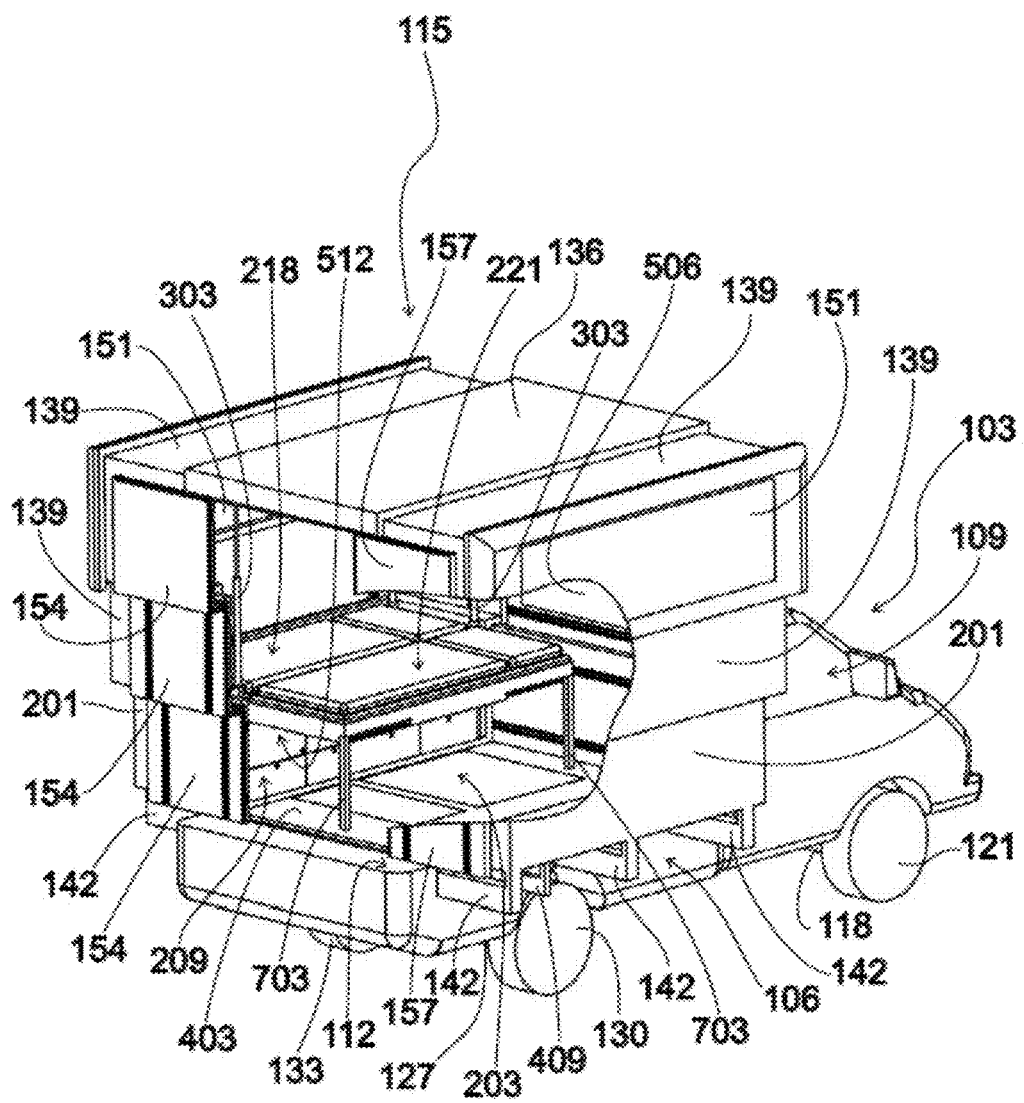
FIG. 7 shows a perspective view of the exemplary embodiment according to FIG. 1 in the arrangement according to FIG. 5 with side walls torn open in the second region with a view of the interior space, now equipped with sleep elements after folding away the seating elements.

FIG. 7 shows a perspective view of the exemplary embodiment according to FIG. 1 in the arrangement according to FIG. 5 with side walls of sliding segments 136, 139, 201 torn open in the second region with a view of the interior space 203 now equipped with both beds 218, 221 as sleeping elements after retracting the seating benches 603 and table 606. The beds 218, 221 are lowered from the ceiling of the left upper double sliding segment 139 to occupy the arrangement according to FIG. 7. The bed 221 on the right and now on the inside in the interior space 203 is held with the bed feet 703 in the unfolded position due to the pivoting mounting of the foldable and retractable bed feet 703, while the left bed 218 rests on the storage area 512 formed on the inside storage cupboards 209.

Figure 8:
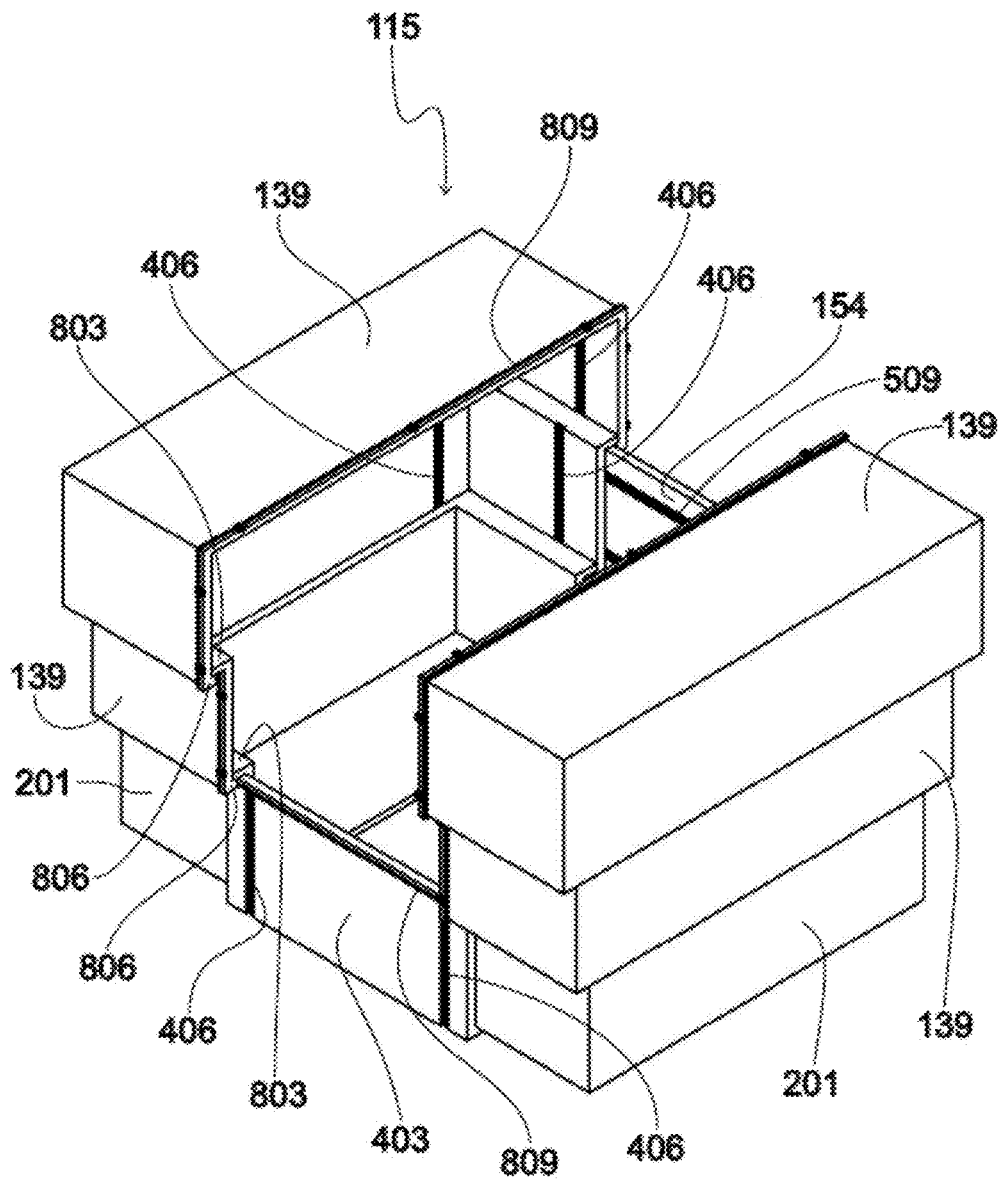
FIG. 8 shows a perspective view of the structure of the exemplary embodiment according to FIG. 1 without equipment and without a vehicle with removed sliding segments of a second group.

FIG. 8 shows a perspective view of the structure in the form of the trailer cabin 115 of the exemplary embodiment according to FIG. 1 without equipment with removed sliding segments 136 of the second group.

From FIG. 8, it can be seen that the lower double sliding segments 139, as well as the lower vertical sliding segment 136 not shown in FIG. 8, are each formed with an upper edge 803 projecting outwardly away from the interior space 203 and with a lower edge 806 projecting inwardly towards the interior space 203, which can be brought into engagement with the complementarily formed outwardly-projecting edges 803 or inwardly-projecting edges 806 of the lower double sliding segments 139 and the upper double sliding segments 139 or with the lower vertical sliding segment 136, such that, when the outer double sliding segments 139 is slid in the vertical direction, the lower double sliding segments 139 and the vertical sliding segments 136 are also each passively moved in the vertical direction.

The expansion position is also assumed in that, for example, the horizontal sliding segments 201 are actively moved in the transverse direction via the rack and pinion drives, not shown, and the double sliding segments 139 are passively carried along.

Furthermore, it can be seen from FIG. 8 that sealing lips 809 are arranged along the edges of the sliding segments 136, 139, 201 of the three groups and also of the central fixed segment 403, which are preferably arranged such that, at every point along the edges of the sliding segments 136, 139, 201 of the three groups as well as the central fixed segment 403 in the expansion position, the respective sealing lips 809 of adjacent sliding segments 136, 139, 201 are in contact with one another in order to ensure that the trailer cabin 115 is impermeable, in particular to water, but also to drafts in the expansion position.

Figure 9:
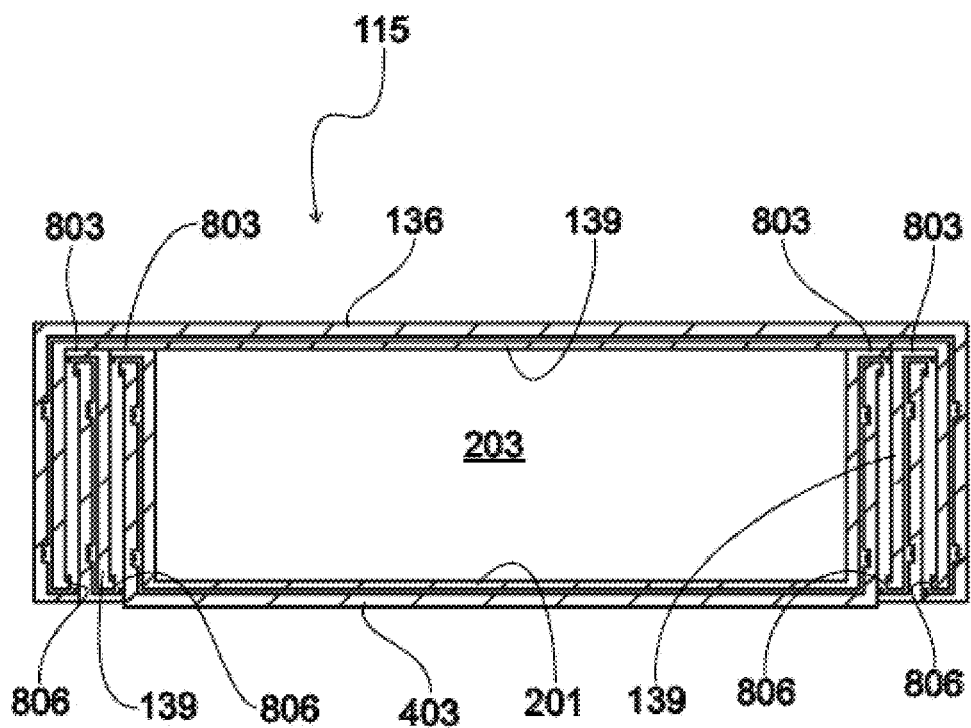
FIG. 9 shows a sectional view in a transverse direction of the structure of the exemplary embodiment according to FIG. 1, again in the compact position.

FIG. 9 shows a sectional view in the transverse direction of the structure of the embodiment according to FIG. 1 in the form of the trailer cabin 115 without installation elements with the sliding segments 136, 139, 201 of the three groups again in the compact position, in which the side walls extending in the longitudinal direction of the sliding segments 136, 139, 201 and of the central fixed segment 403 are arranged close to one another at the edge. From FIG. 9, it can be seen that the outwardly-projecting edges 803, which are longer than the inwardly-projecting edges 806, rest against the side wall of the adjacent sliding segment 136, 139 and, when these adjacent sliding segments 136, 139 are slid in the vertical direction, the inwardly-projecting edges 806 abut the outwardly-projecting edges 803 so that the engagement is completed and passive entrainment is effected.

Figure 10:
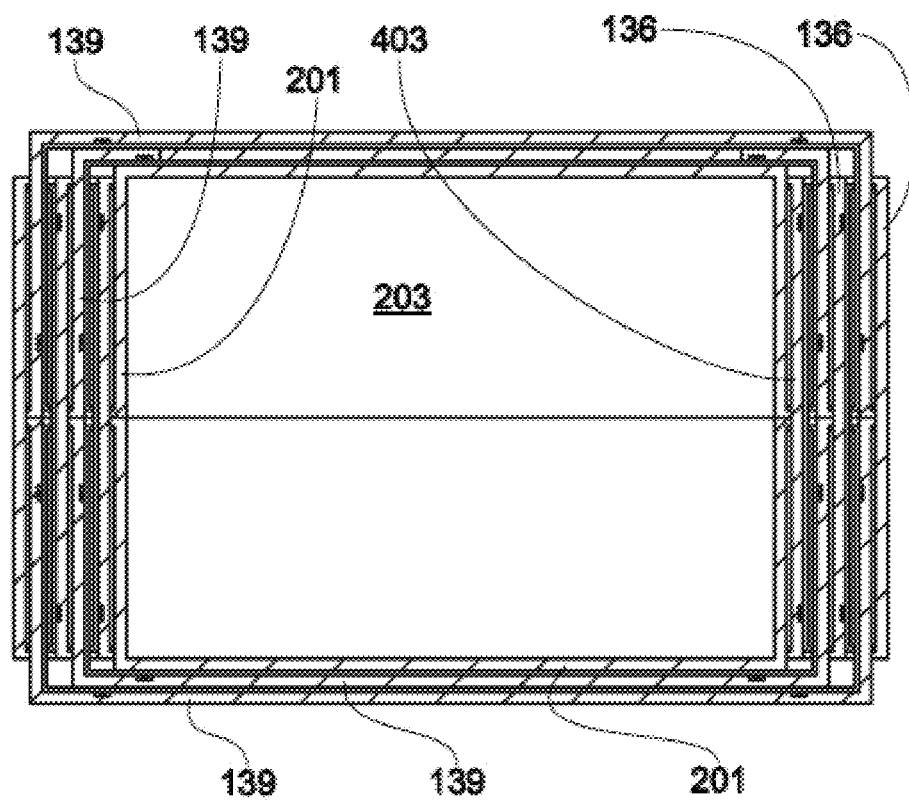
FIG. 10 shows a sectional view in the plane of a central fixed segment of the structure of the exemplary embodiment according to FIG. 1 in the arrangement according to FIG. 9.

FIG. 10 shows a sectional view in a sectional plane lying within the plane of the central fixed segment 403 of the structure of the exemplary embodiment according to FIG. 1 in the form of the trailer cabin 115 in the arrangement according to FIG. 9. From FIG. 10, it can be seen that the side walls extending in the transverse direction of the sliding segments 136, 139, 201 and of the central fixed segment 403 are arranged close to one another at the edge.

Figure 11:
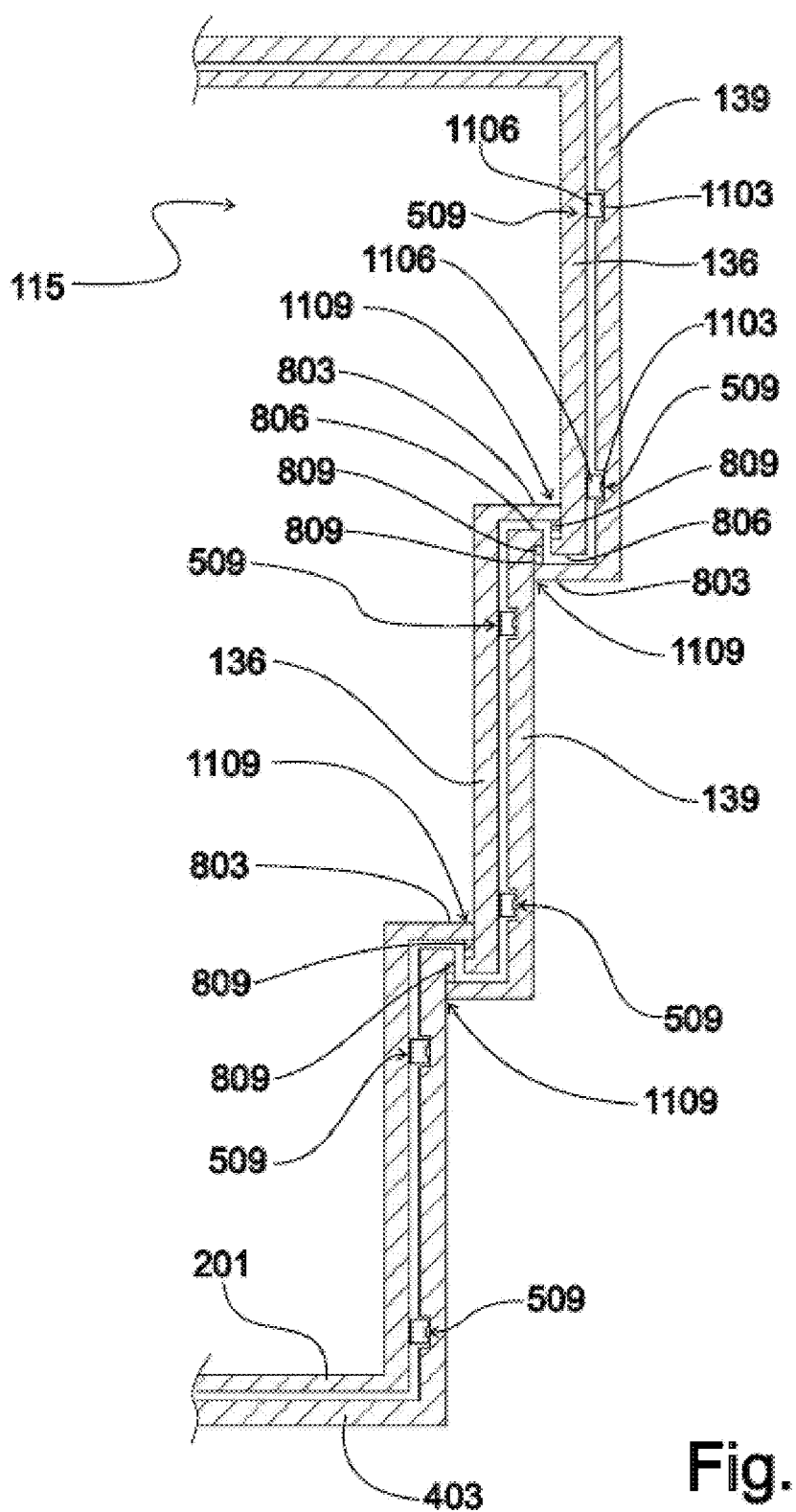
FIG. 11 shows a sectional view in a longitudinal direction of a wall area of sliding segments of the structure of the exemplary embodiment according to FIG. 1 in the expansion position.

FIG. 11 shows a sectional view in a longitudinal direction of a wall area of sliding segments 136, 139, 201 and the central fixed segment 403 of the structure of the embodiment according to FIG. 1 in the form of the trailer cabin 115 in the expansion position. From FIG. 11, it can be seen that, between the side walls of the sliding segments 136, 139, 201 and the central fixed segment 403, there are preferably pairs of horizontal guides 509, each of which is formed with a horizontal guide rail 1103 and with a horizontal guide carriage 1106 engaging with the relevant horizontal guide rail 1103. As a result, the sliding segments 136, 139, 201 are guided one below the other and opposite the central fixed segment 403 with a relatively small distance between the side walls and with little friction loss.

Furthermore, the representation according to FIG. 11 shows that in the expansion position the inwardly-projecting edges 803 and the outwardly-projecting edges 806, each with intermediate sealing lips 809, are in contact with one another in pairs at circumferential contact regions 1109, or all-inclusive connection points so to speak. This ensures a very high degree of stability and good sealing of the structure.

Figure 12:
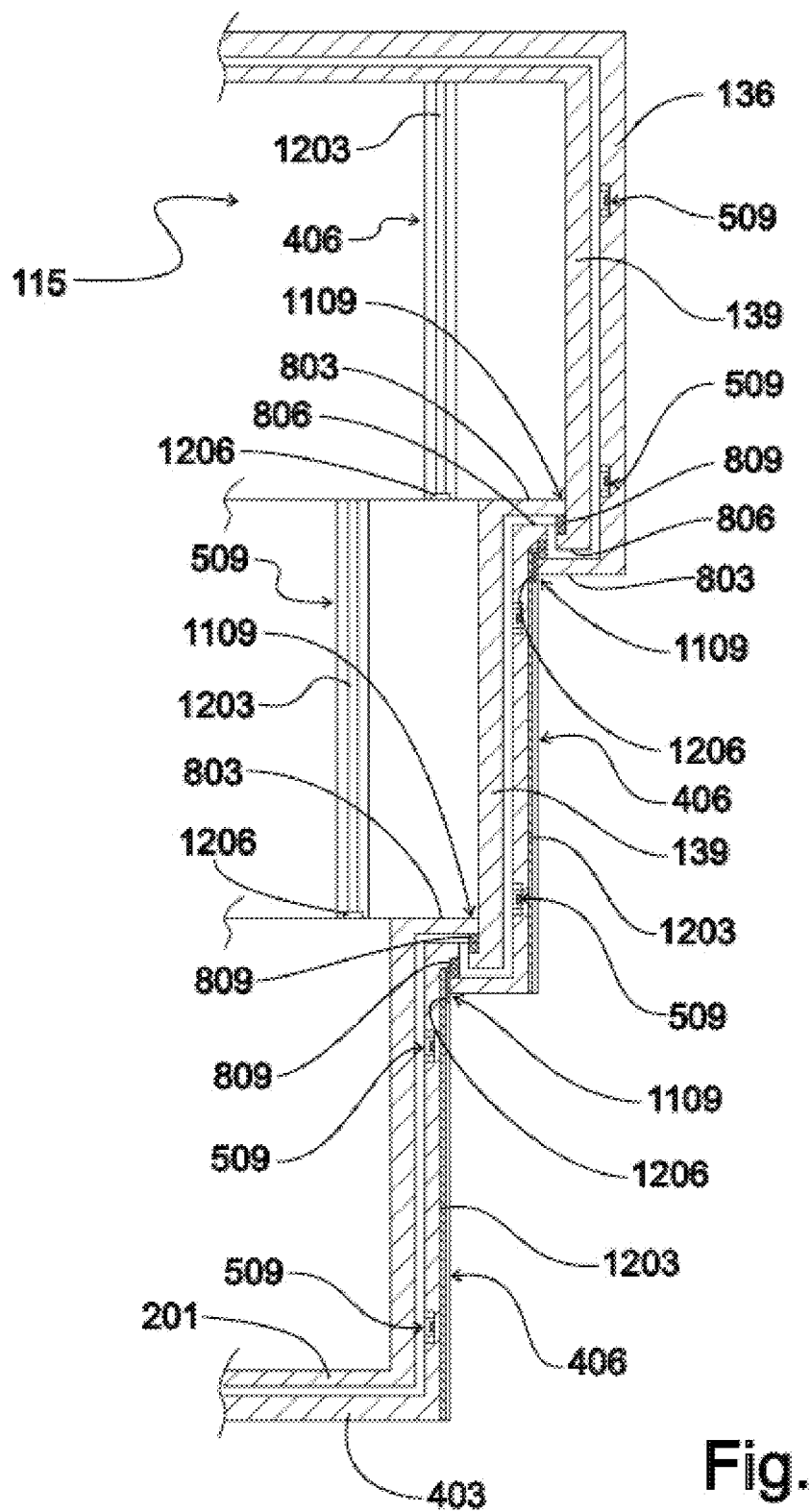
FIG. 12 shows a sectional view corresponding to FIG. 11 in a further sectional plane of the structure of the exemplary embodiment according to FIG. 1 in the expansion position.

FIG. 12 shows a sectional view corresponding to FIG. 11 in a further sectional plane of the structure of the exemplary embodiment according to FIG. 1 in the form of the trailer cabin 115 in the expansion position. From FIG. 12, it can be seen that the vertical guides 406 each have a vertical guide rail 1203 and a vertical guide carriage 1206, which ensure that the vertical sliding segments 136 and double sliding segments 139 are guided in the vertical direction as an extension direction.

Figure 13:
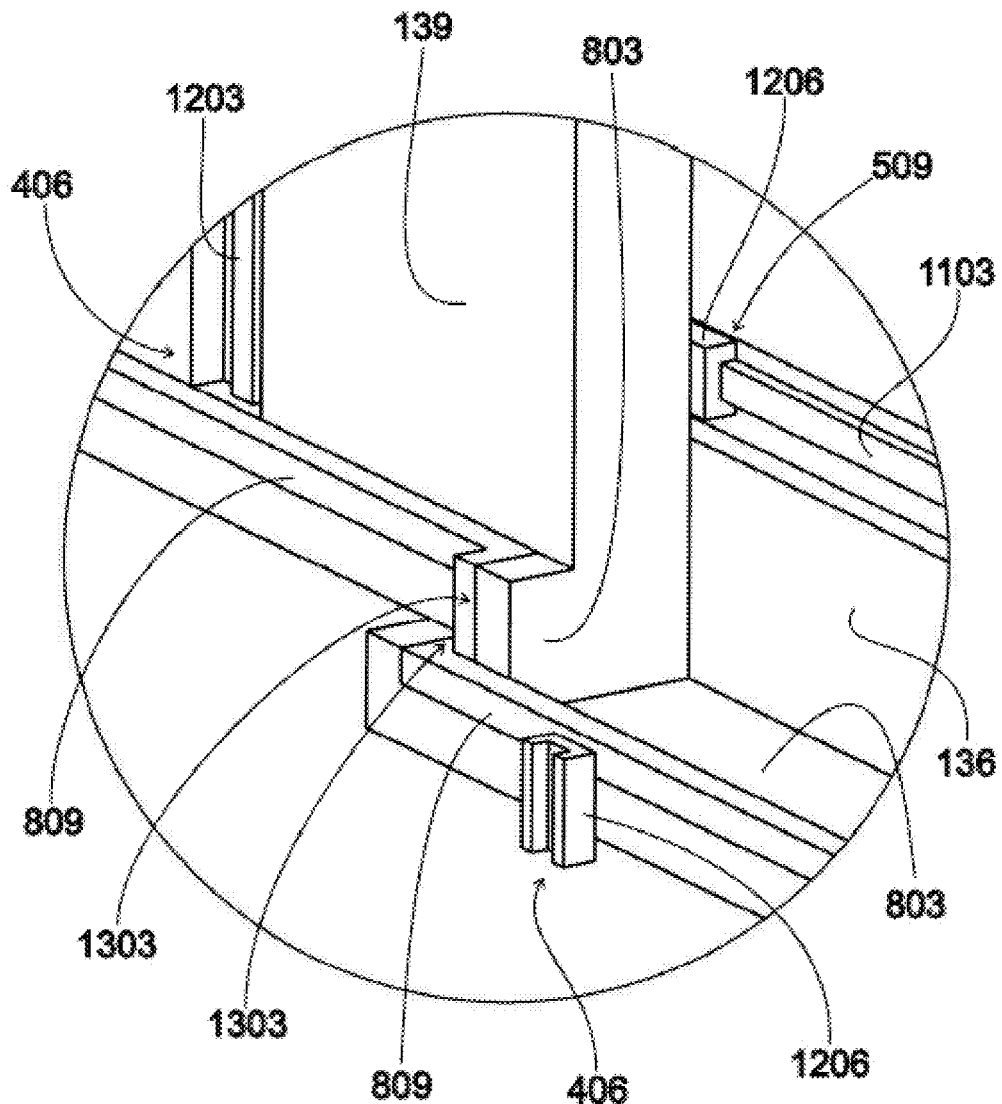
FIG. 13 shows a perspective view of a section of the exemplary structure in the joint area of sliding segments.

FIG. 13 shows a perspective view of a detail of the exemplary structure in the form of the trailer cabin 115 in the joint area of a sliding segment 136 of the first group with a sliding segment 139 of the third group. From FIG. 13, it can be seen that the sealing lips 809 of the adjacent double sliding segments 139 have angled contact sections 1303 which, in the expansion position shown here, rest against one another and thus ensure impermeability.

Figure 14:
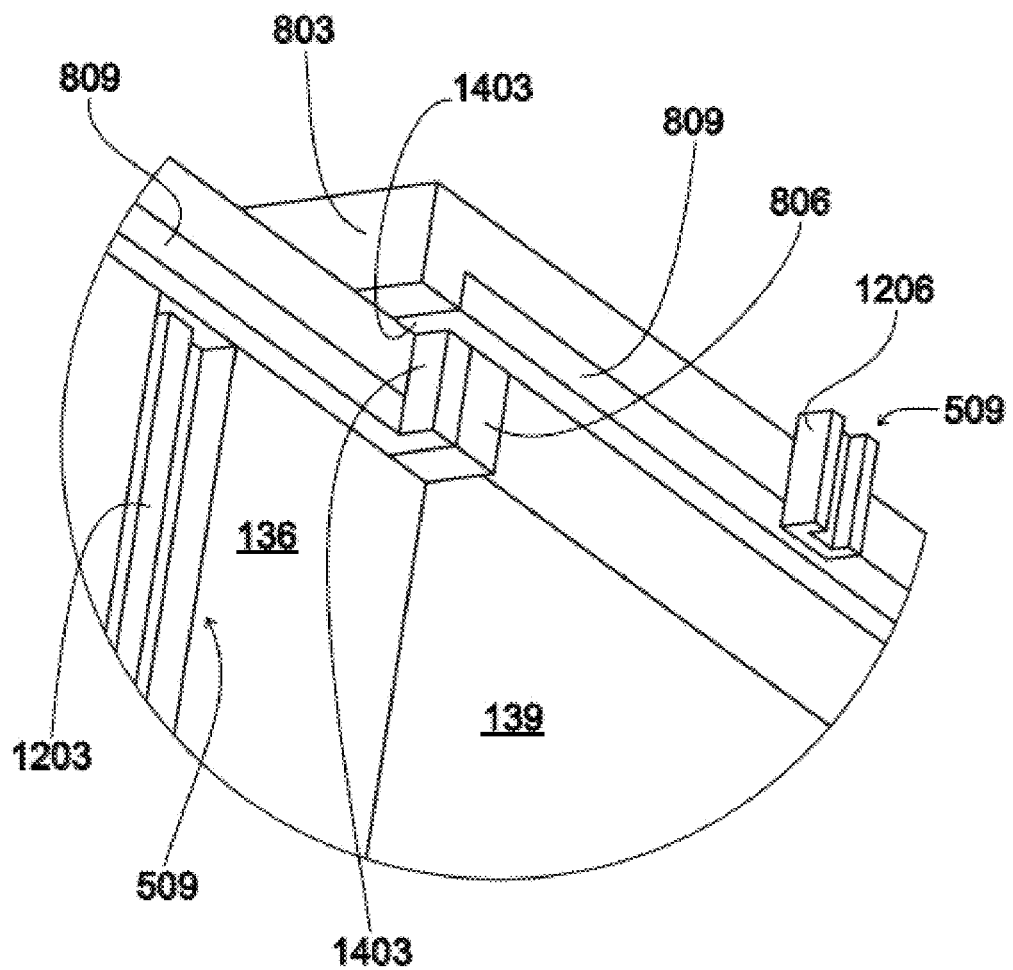
FIG. 14 shows a further perspective view of a section of the exemplary structure in the joint area of sliding segments.

FIG. 14 shows a perspective view of a detail of the exemplary structure in the form of the trailer cabin 115 in the joint area of a sliding segment 136 of the second group with a sliding segment 139 of the third group. Here, too, the sealing lips 809 of the adjacent vertical sliding segments 136 have angled contact sections 1403 which, in the expansion position shown in FIG. 14, rest against one another in a sealing manner.

Figure 15:
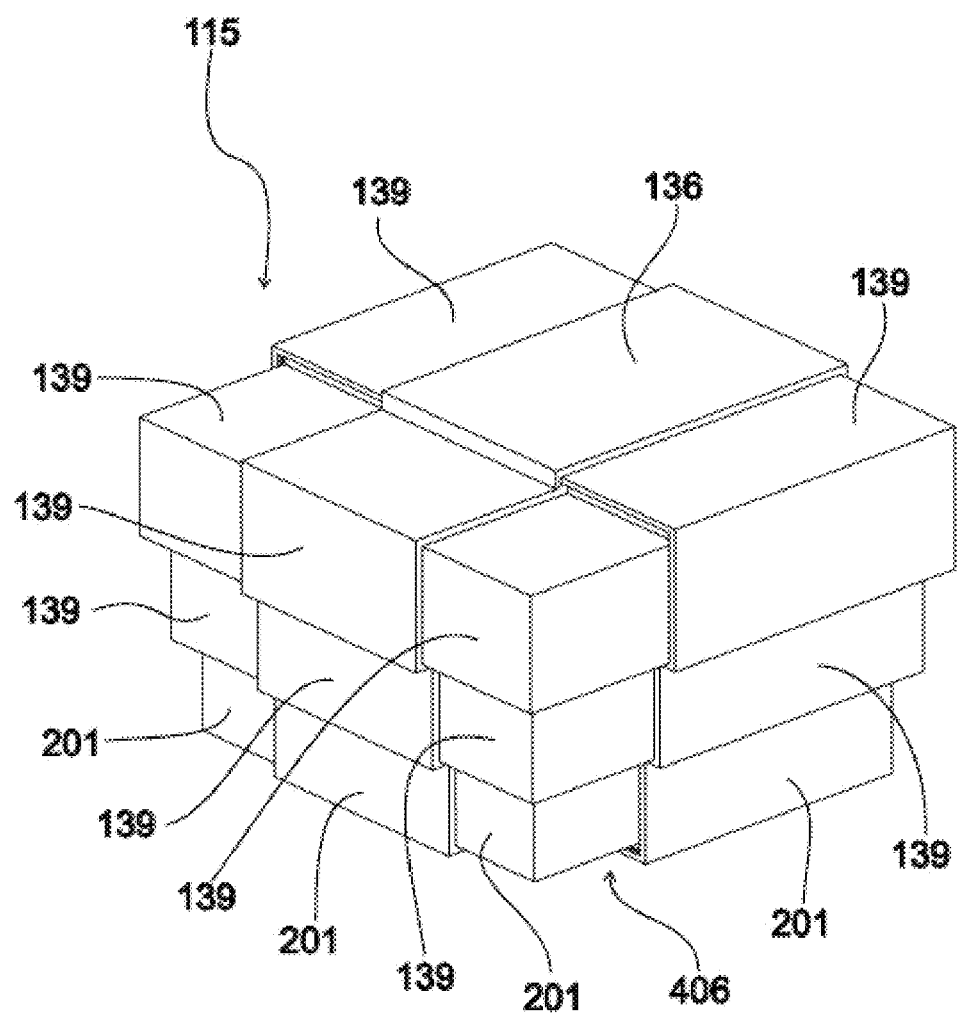
FIG. 15 shows a perspective view of a further exemplary embodiment of a structure with sliding segments being slidable in two expansion directions in an expansion position.

FIG. 15 shows a perspective view of a further exemplary embodiment of a structure designed as a trailer cabin 115 having sliding segments 136, 139, 201 of the first group and the third group being slidable in two expansion directions, namely in a transverse direction and in a longitudinal direction, in an expansion position. The representation according to FIG. 15 shows that, compared to the exemplary embodiment explained above with reference to FIG. 1 to FIG. 14, there are further horizontal sliding segments 201 of the first group and further double sliding segments 139 of the third group, which are slidable in the longitudinal direction. Here, sliding segments 139, 201 arranged in corner regions engage, on the one hand, in sliding segments 139, 201 which are slidable in the transverse direction and, on the other hand, in sliding segments 139, 201 which are slidable in the longitudinal direction. The sliding segments 139, 201 arranged centrally between the corner regions in turn engage in vertical sliding segments 136 or in the central fixed segment 406 which is not visible in the representation according to FIG. 15.

Figure 16:
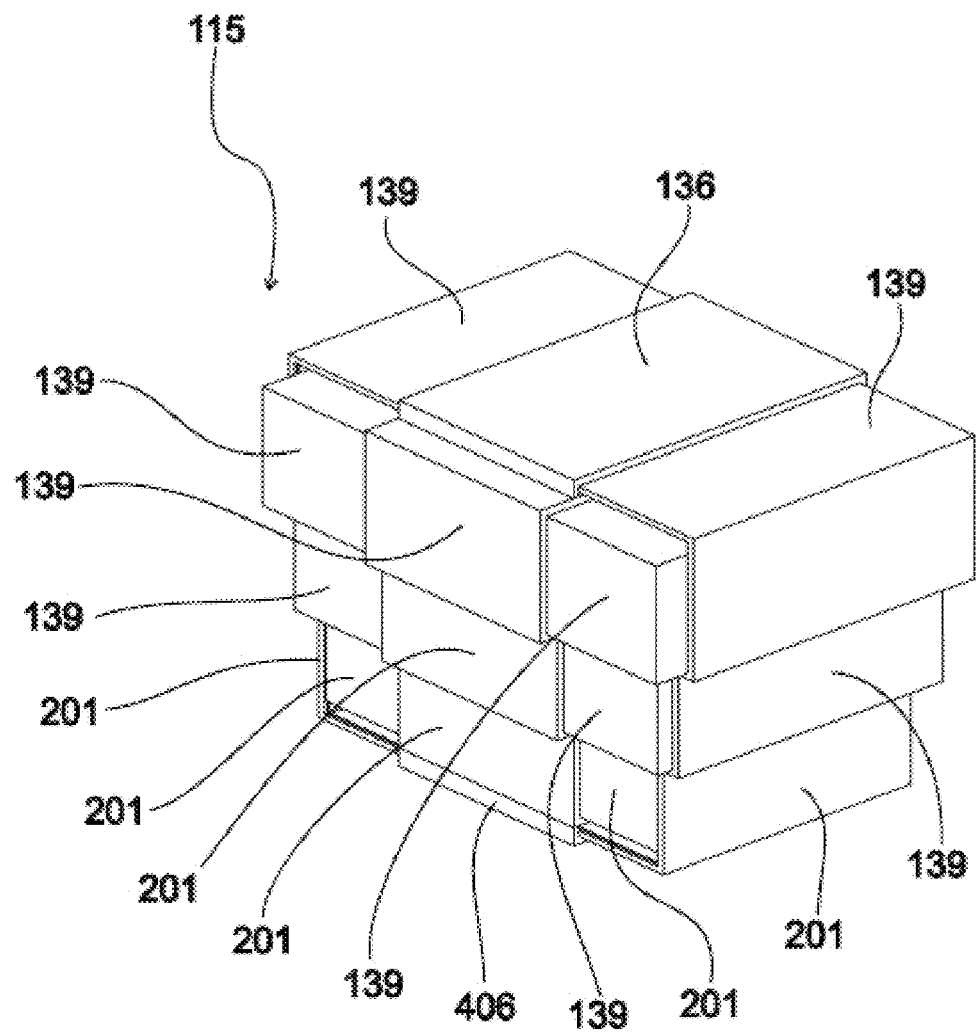
FIG. 16 shows a perspective view of the embodiment according to FIG. 15 with the sliding segments in a first intermediate position that is smaller than the expansion position.

FIG. 16 shows a perspective view of the exemplary embodiment according to FIG. 15 with the sliding segments 136, 139, 201 in a first intermediate position which reduces the interior space 203 compared to the expansion position. In the first intermediate position according to FIG. 16, compared to the expansion position according to FIG. 15, the sliding segments 139, 201, which are slidable in the longitudinal direction, are inserted.

Figure 17:
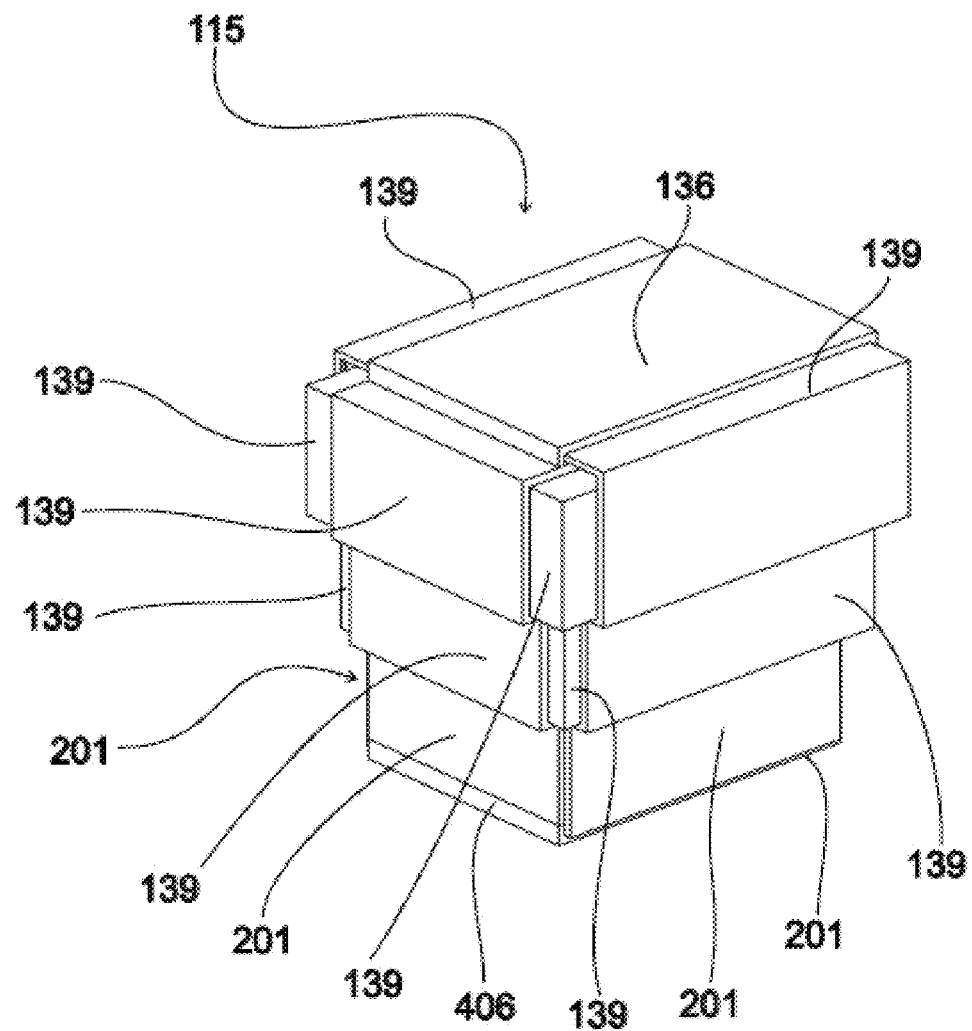
FIG. 17 shows a perspective view of the exemplary embodiment according to FIG. 15 with the sliding segments in a second intermediate position that is smaller than the first intermediate position.

FIG. 17 shows a perspective view of the exemplary embodiment according to FIG. 15 with the sliding segments 136, 139, 201 in a second intermediate position which further reduces the interior space 203 compared to the first intermediate position according to FIG. 16. In the second intermediate position according to FIG. 17, compared to the first intermediate position according to FIG. 16, the sliding segments 139, 201, which are slidable in the transverse direction, are now inserted.

Figure 18:
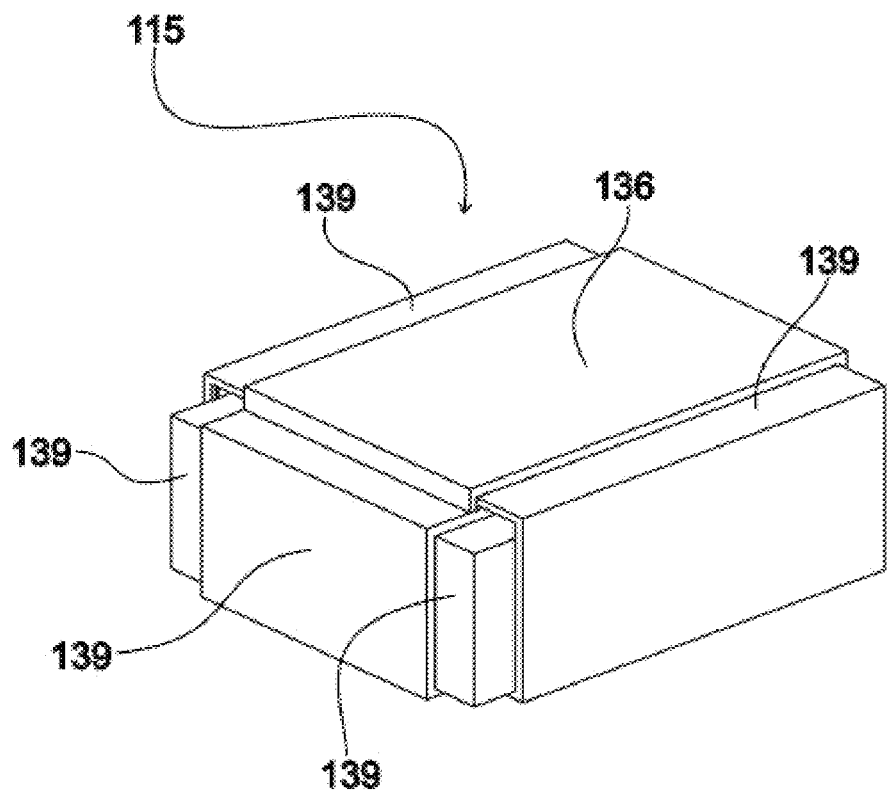
FIG. 18 shows a perspective view with the sliding segments in a compact position.

Finally, FIG. 18 shows a perspective view of the exemplary embodiment according to FIG. 15 with the sliding segments 136, 139, 201 in a compact position reducing the interior space 203 to a minimum. In the compact position according to FIG. 18, the sliding segments 136 of the second group, which can be slidable in the vertical direction as the extension direction, are now also inserted.

The sequence of sliding the sliding segments 136, 139, 201 of the three groups between the expansion position and the compact position, explained with reference to FIG. 15 to FIG. 18, represents an example of a handling option for the trailer cabin 115.

With a comparatively slightly higher utilisation of the interior space 203 in the compact position compared to the exemplary embodiment explained on the basis of FIG. 1 to FIG. 14 due to a higher number of side walls and cover walls of the sliding segments 136, 139, 201 arranged on the inside in the compact position, the exemplary embodiment according to FIG. 15 is characterised however by a particularly large usable space.

It goes without saying that the structure at least temporarily can also be used independently of a vehicle for different purposes, for which the important aspect is a relatively small space requirement for transport and a relatively large amount of space in a usage arrangement.

For example, the structure can be designed as a so-called detachable cabin so that the base vehicle is free again and the structure can remain at a campsite, for example.

In a further embodiment, the structure is designed as a mobile home, in which it is built on a trailer.

Furthermore, the structure can be used in conjunction with a sailing boat or motor boat, where it leads to a relatively low centre of gravity in a collapsed arrangement, but when moved apart forms a relatively large cabin.

In addition, the structure can be designed as a transport container that is flexible in size, which, for example, leads to considerable space savings on container ships when transported as an empty container.

The structure can also be designed as temporary accommodation, for example for refugees, and used in particular in inhospitable areas, which offers significantly better protection than tents, with space-saving transport to the destination.

Structures can also be designed multifunctionally with solid walls for research purposes or for military purposes, for example as a radio cabin, kitchen cabin, recreation cabin, sleeping cabin or weapon container.

A structure can also be designed for research in space or on other planets because it requires very little space during transport.

The invention claimed is:

1. A structure for receiving, selectively, equipment arranged in an interior space (203) and for providing, when necessary, a usable space extending the interior space (203), comprising:
a central fixed segment (403); and
a number of sliding segments (201), mounted slidably in relation to the central fixed segment (403) in a plane in at least one expansion direction, which sliding segments are slidable between a compact position having a minimum volume and an expansion position having a maximum volume,
wherein the sliding segments (136, 139, 201) are formed as at least one sliding segment (201) of a first group,
wherein the or each sliding segment (201) of the first group is slidable in at least one expansion direction within a first plane, as at least one sliding segment (136) of a second group,
wherein the or each sliding segment (136) of the second group is slidable in an extension direction oriented at a right angle to the or each expansion direction within at least one second plane different from the first plane, and as at least one sliding segment (139) of a third group,
wherein the or each sliding segment (139) of the third group is slidable both in the or one expansion direction within the first plane and within the or a second plane in the second direction,
wherein at least one sliding segment (139) of the third group engages with respectively one sliding segment (136, 201) of the two other groups,
wherein sliding segments (136, 139, 201) of the three groups are designed with guides (406, 509) oriented at right angles to each other, in each case attached to the walls of the central segment (403) and the sliding segments (136, 139, 201), and with pairs of peripheral contact regions (1109) formed by inwardly-projecting edges (803) and outwardly-projecting edges (806) which are longer than the inwardly-projecting edges (803), in each case with intermediate sealing lips (809), such that inwardly-projecting edges (803) and outwardly-projecting edges (806) of sliding segments (136, 139) of the second group or the third group can be brought into engagement, in pairs, within the respective group.

2. The structure according to claim 1,
wherein the guides (406, 509) in each case have a guide rail (1103, 1203) and a guide carriage (1106, 1206) engaging with the relevant guide rail (1103, 1203).

3. The structure according to claim 1,
wherein the sliding segments (136, 139, 201) of the three groups are mounted so as to slide into one another such that, due to the sliding segments (136, 139, 201) of the three groups sliding completely into one another with side walls and top walls arranged closely adjacent to one another with a wall-free interior space (203), the minimum volume of the structure (115) in the compact arrangement corresponds to the volume occupied by the outermost sliding segment (136, 139) of one of the groups.

4. The structure according to claim 1,
wherein the central fixed segment (403) and sliding segments (136) of the second group in each case engage with two sliding segments (139, 201) of the first group and the third group,
wherein the two sliding segments (139, 201) of the first group and the third group are arranged on opposite sides of the central fixed segment (403) or sliding segment (136) of the second group engaging with them.

5. The structure according to claim 1,
wherein sliding segments (139, 201) of the first group and the third group are slidable in two expansion directions oriented at right angles to each other and that sliding segments (139, 201) of the first group as well as the third group engage in corner regions between sliding segments (139, 201) of the first group as well as the third group engaging with sliding segments (136) of the second group or with the central fixed segment (403).

6. The structure according to claim 1,
wherein the outwardly-projecting edges (806) and the inwardly-projecting edges (803) engage alternatingly with one another in order to ensure that, when a sliding segment (136, 139, 201) moves, other sliding segments (136, 139, 201) are passively moved along therewith.

7. The structure according to claim 1,
wherein sliding segments (136) of a group and the central fixed segment (403) are equipped with door leaves (154, 157) which, in the expansion position of these sliding segments (136), are arranged within the different planes so as to align with one another.

8. The structure according to claim 1,
wherein at least one supporting strut (142) is attached to the or each sliding segment (139) of the first group engaging with the central fixed segment (403).

9. The structure according to claim 8,
wherein the supporting strut (142) or supporting struts (142) extend in the first direction.

10. The structure according to claim 1,
wherein installation elements (206, 209, 212, 215, 218, 221, 309, 503, 603, 606) are attached, selectively, as equipment, to at least one sliding segment (136, 139, 201) of at least one group and to the central fixed segment (403).

11. The structure according to claim 10,
wherein, in the compact position, at least some installation elements (206, 209, 212, 215, 218, 221, 309, 503, 603, 606) directly adjoin one another.

12. The structure according to claim 10,
wherein at least one installation element (309, 503) is connected to a flexible supply line (409).

13. A vehicle, equipped with the structure according to claim 1.

14. The vehicle according to claim 13,
wherein the structure further comprises at least one supporting strut (142) which is attached to the or each sliding segment (139) of the first group engaging with the central fixed segment (403), and
wherein the supporting strut (142) or supporting struts (142) is/are mounted slidably on a body (106) of the vehicle (103).

15. The vehicle according to claim 13,
wherein at least one installation element (309, 503) is connected to a flexible supply line (409), and
wherein the supply line (409) or supply lines (409) is/are connected with the vehicle (103).

* * * * *